United States Patent [19]

Werner et al.

[11] 4,014,423
[45] Mar. 29, 1977

[54] CLUTCH PLATE FOR A FRICTION CLUTCH

[75] Inventors: Karl-Heinz Werner; Gerhard Baron; Kurt Fädler, all of Schweinfurt am Main, Germany

[73] Assignee: Fichtel & Sachs A.G., Schweinfurt am Main, Germany

[22] Filed: July 30, 1973

[21] Appl. No.: 383,615

[30] Foreign Application Priority Data

Aug. 4, 1972 Germany .......................... 2238947

[52] U.S. Cl. .............................. 192/106.2; 64/27 C
[51] Int. Cl.² ..................... F16D 3/14; F16D 47/02
[58] Field of Search ............ 192/106.1, 106.2, 302; 64/27 C, 27 F

[56] References Cited

UNITED STATES PATENTS

| | | | |
|---|---|---|---|
| 1,952,892 | 3/1934 | Reed | 192/106.1 |
| 2,127,996 | 8/1938 | Havill | 64/27 F |
| 3,138,011 | 6/1964 | Stromberg | 64/27 F |
| 3,266,271 | 8/1966 | Stromberg | 192/106.2 X |
| 3,534,841 | 10/1970 | Schneider et al. | 192/106.2 |
| 3,578,121 | 5/1971 | Maurice | 192/106.2 |
| 3,817,362 | 6/1974 | Rist | 192/106.1 |

Primary Examiner—Benjamin W. Wyche
Assistant Examiner—Lance W. Chandler
Attorney, Agent, or Firm—Hans Berman

[57] ABSTRACT

A driven plate for an automotive friction clutch having a hub unit and a disc unit rotatable on the hub unit and carrying the friction facings of the clutch is equipped with helical compression springs simultaneously received in respective openings of a hub flange and of two discs of the disc unit along a common circle about the clutch axis for damping relative motion of the two units. The two discs are axially fixedly connected by shoulder rivets which act as spacers and pass through openings in the hub flange also receiving respective damping springs.

4 Claims, 4 Drawing Figures

CLUTCH PLATE FOR A FRICTION CLUTCH

This invention relates to friction clutches of the type commonly employed in automotive vehicles, and particularly to an improved clutch plate or driven plate.

The plate with the improvement of which this invention is concerned has been disclosed in U.S. Pat. No. 2,309,950. The known clutch plate has a hub unit normally secured against rotation on the driven shaft of the clutch, but axially movable on the shaft, a disc unit rotatable on the hub unit and having two radial discs on axially opposite sides of a hub flange of the hub unit, and helical springs mounted in axially at least partly coextensive openings of the hub flange and the two discs, the several sets of openings being arranged along a common circle about the common axis of the two units. One of the discs carries the friction facings of the clutch, and the two discs are fixedly connected by spacer rivets which pass through respective apertures in the flange hub, radially offset from the openings for the springs. Circumferential abutment of the rivets against the edges of the flange hub limits deformation of the helical springs and relative angular motion of the two units about the clutch axis.

An object of the invention is a modification of the afore-described clutch plate which permits the relative angular displacement of the two units to be increased without increasing the overall dimensions of the plate, and without increasing the cost of making the plate, yet without impairing the function thereof.

According to the invention, the spacer members or rivets axially connecting the two discs of the disc unit pass through the same openings in the flange plate which also hold damping springs, thereby increasing the space available for the springs and permitting the use of stronger springs without increasing the available relative angular motion of the two units, or a substantially increased angular displacement of the two units at equal maximum torque, as compared to the conventional clutch plate.

Other features, additional objects, and many of the attendant advantages of this invention will readily become apparent from the following detailed description of preferred embodiments when considered in connection with the appended drawing in which.

Figure 1:
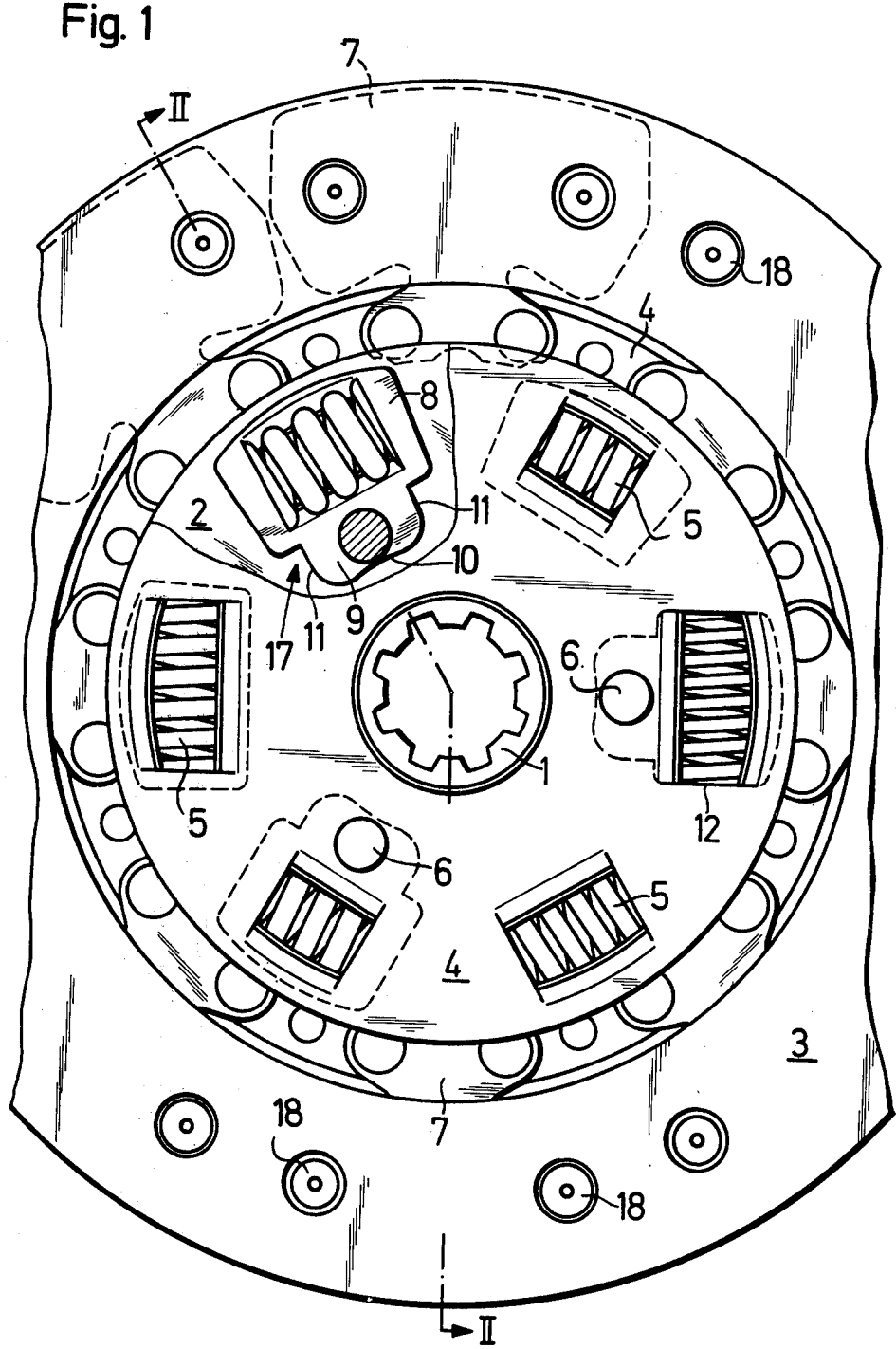
FIG. 1 shows a clutch plate of the invention in fragmentary front elevation, a portion of one disc being broken away to reveal the clutch hub.
Figure 2:
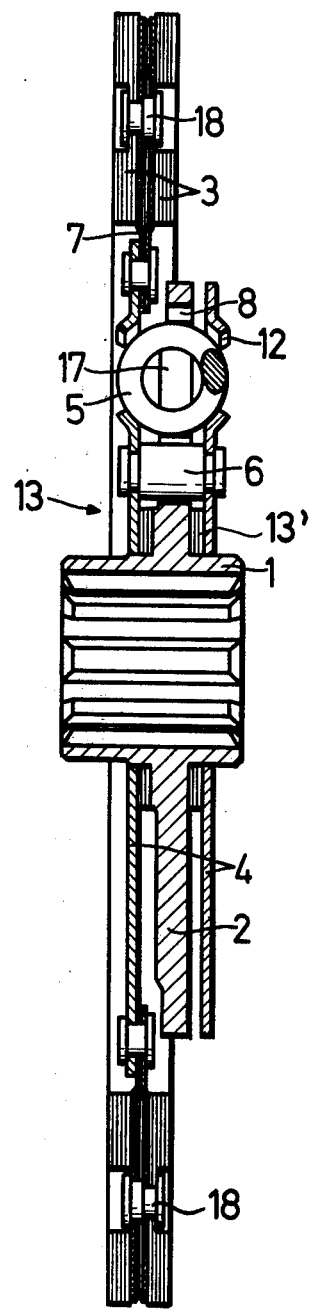
FIG. 2 illustrates the apparatus of FIG. 1 in section on the line II — II.

Referring initially to FIGS. 1 and 2, there is seen a clutch plate whose hub unit consists of an internally splined, tubular hub sleeve 1 and a hub flange 2 integrally fastened to the sleeve 1 and projecting radially outward therefrom. The friction facings 3 of the plate are carried by one of two radial discs 4 coaxially rotatable on the sleeve 1 and offset from the flange 2 in opposite axial directions. Axial passages through the discs 4 and the flange 2 arranged along a common circle about the clutch axis retain six helical compression springs 5 whose axes are approximately tangential to the common circle.

The two discs 4 are fixedly fastened to each other in axially spaced relationship by three shoulder rivets 6 axially extending through respective passages also holding springs 5. Other rivets attach segments 7 to the outer circumference of one disc 4, and the friction facings 3 are secured to the segments 7 by further rivets 18.

The passages through the discs 4 and the hub flange 2 are provided by respective sets of three openings axially extending through the discs and the flange, a portion of each opening in the flange 2 being circumferentially coextensive with respective identical openings 12 of the same set in the two discs 4.

Three of the openings in the flange 2 differ from the associated openings 12 by being slightly longer in a circumferential direction and slightly wider in a radial direction. In the other three openings 17 which are equiangularly spaced about the plate axis in the flange 2 and circumferentially alternate with the first-mentioned three flange openings, the springs 5 are received with circumferential and radial clearance in radially outer portions 8 of the openings 17 which differ from the corresponding openings 12 of the same set by slightly greater circumferential and radial dimensions.

A radially inner portion 9 of each opening 17 is open toward the outer portion 8 over its entire circumferential length which is smaller than that of the outer portion 8. Each inner portion 9 is bounded in a radially inward direction by an edge 10 of the flange hub 2 which is circular about the plate axis over its major, circumferentially central section, and the portion 9 is bounded circumferentially by two, approximately radially extending edges 11 of the hub 2. Each spacer rivet 6 passes through the inner portions 9 of a corresponding opening 17 and is radially offset in an inward direction from the spring 5 received in the same opening 17. Circumferential movement of each spacer rivet 6, and thus the relative angular movement of the hub and disc units, is limited by abutting engagement of the rivet 6 with the edges 11.

The relative angular displacement of the hub and disc units from the position shown in FIG. 1 is opposed by the springs 5, and any relative movement of the two units is impeded by a friction brake 13 (FIG. 2) essentially consisting of rings 13' of friction facing material axially interposed between the two radial faces of the flange 2 and the two discs 4 respectively near the hub sleeve 1.

The several springs 5 differ in their circumferential dimensions and abuttingly cooperate with edges of the flange 2 and of the discs 4 which circumferentially bound the associated openings of corresponding circumferential length to vary the torque required for rotating the disc and hub units relative to each other as the angle of displacement changes, this arrangement and its effects being too well known to require further description or explanation.

Because of the location of the spacer rivets 6 in the inner portions 9 of the openings 17 in the flange hub 2, the portions 8 can be made relatively long in a circumferential direction to accommodate either very strong springs 5 or to permit relative angular motion of the two plate units over a relatively great angle. The radial dimensions of the flange 2 may be made very small, only minimal clearances being provided between each spring 5 and associated spacer rivet 6, and between the latter and the circularly convex edge 10. The circular shape of the edge 10 provides maximum structural strength to the flange portion radially interposed between the opening portion 9 and the sleeve 1.

Figure 3:
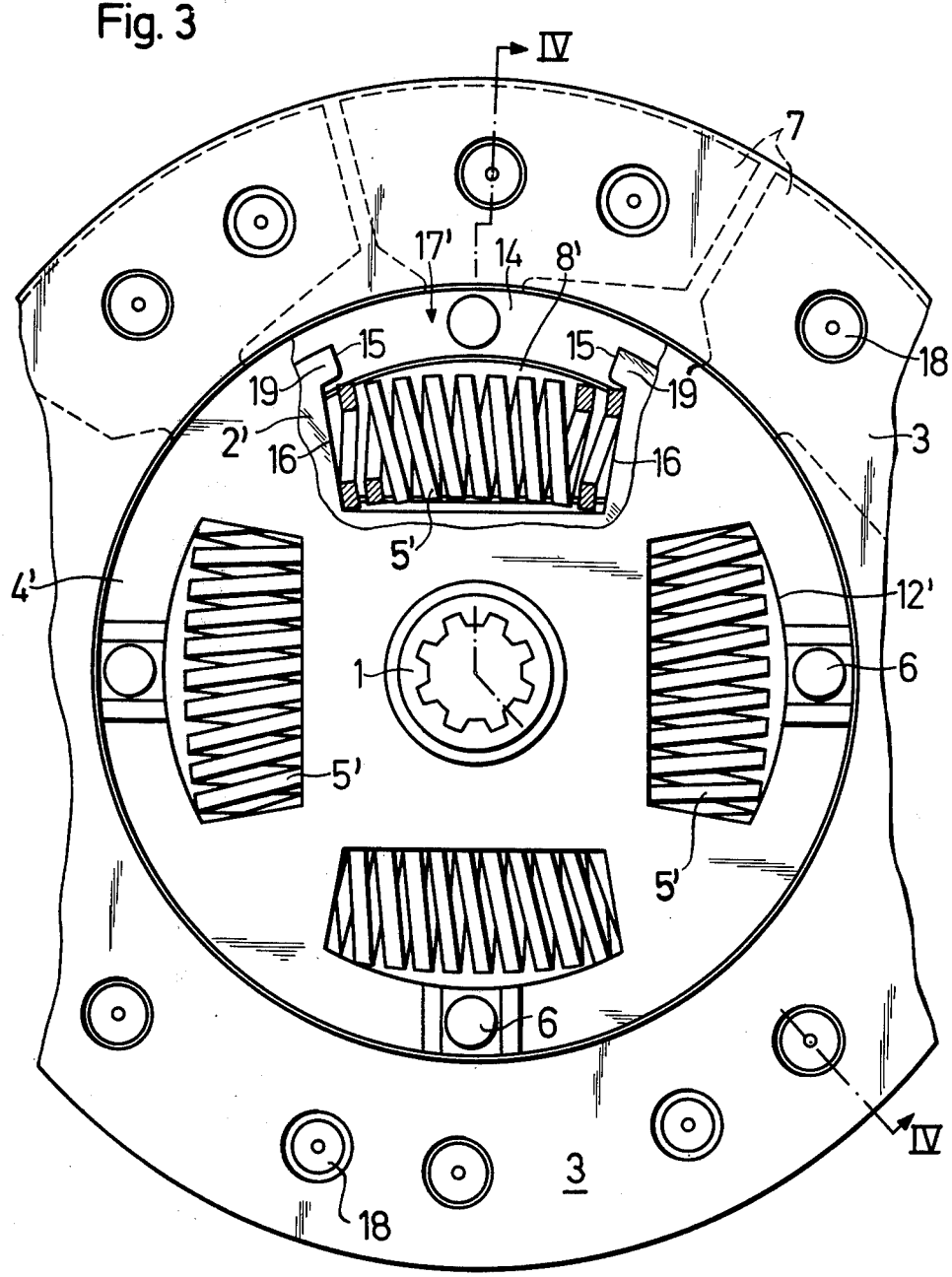
FIGS. 3 and 4 show a second embodiment of the invention in respective views corresponding to those of FIGS. 1 and 2, FIG. 4 showing a section on the line IV —IV in FIG. 3.
Figure 4:
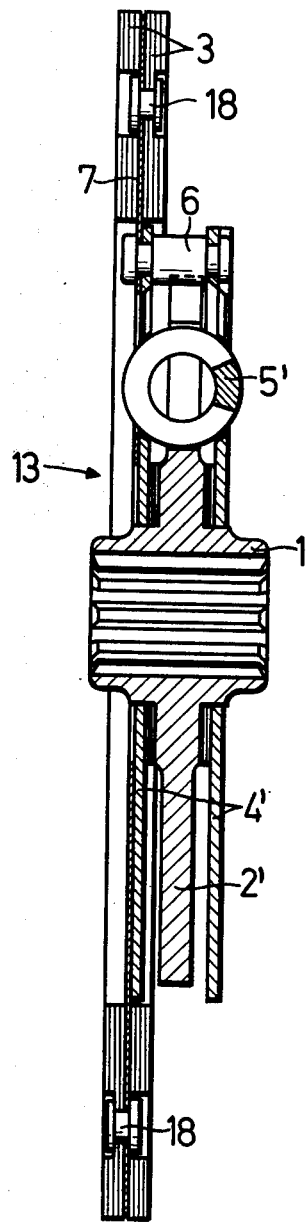

The modified clutch plate of the invention shown in FIGS. 3 and 4 differs from that illustrated in FIGS. 1 and 2 mainly by four openings 17' in the hub flange 2' which are open in a radially outward direction and in which the four rivets 6 are arranged together with for springs 5', the rivets being offset from the springs in a radially outward direction. The hub sleeve 1, friction facings 3, rivets 6, segments 7, friction brake 13, and rivets 18 of the second embodiment are practically identical with the corresponding elements shown in FIGS. 1 and 2.

The flange hub 2' has four openings 17' extending axially therethrough and having each an orifice portion 14 open in a radially outward direction and circumferentially restricted by two projectings 19 of the hub flange 2'. Opposite, approximately radial abutment faces 15 of the projections 19 and the rivet 6 associated with the same opening 17' are radially approximately equidistant from the common axis of the hub and disc units so that the faces 14 limit relative angular movement of the two units. The edges 16 of the flange 2' circumferentially bounding the radially inner portion 8' of each opening 17' are recessed behind the projections 19 so that the projections radially confine both ends of the associated springs 5' in the illustrated rest position of the clutch plate.

The two openings 12' of the discs 4' which constitute a set of openings with each of the openings with each of the openings 17' have straight radially inner edges which define a square centered in the plate axis. The springs 5' simultaneously received in the openings 12', 17' of each set are approximately rectangular in section perpendicular to the plate axis, and permit the wide angular displacement of the hub and disc units defined by the rivets 6 and the abutment faces 15, amounting to ± 20° from the illustrated rest position. Springs of the illustrated rectangular shape are particularly suitable for operation over such relatively great angles of displacement.

The embodiment of the invention illustrated in FIGS. 3 and 4 shares the modest space requirements and other advantages of the plate described above with reference to FIGS. 1 and 2. Additionally, it can be manufactured at relatively low cost.

It should be understood, of course, that the foregoing disclosure relates only to preferred embodiments of the invention, and that it is intended to cover all changes and modifications in the examples of the invention chosen herein for the purpose of the disclosure which do not constitute departures from the spirit and scope of the invention set forth in the appended claims.

What is claimed is:

1. A clutch plate for a friction clutch comprising:
   a. a hub unit including a tubular hub member having an axis, and a flange member projecting from said hub member in a radially outward direction and fixedly fastened to said hub member;
   b. a disc unit including a first radial disc member and a second radial disc member coaxially rotatable relative to said hub unit and offset from said flange member in opposite axial directions, and a plurality of spacer members axially connecting said disc members for joint movement,
      1. said flange member and said disc members being each formed with a plurality of openings extending axially therethrough, a portion of each opening in said flange member being circumferentially coextensive with respective openings in said disc members and constituting a set of three openings with the circumferentially coextensive openings in said disc members; and
   c. a helical compression spring simultaneously received in the three openings of each set, and extending tangentially relative to a circle about said axis,
      1. said spacer members passing through respective openings in said flange member in radially outwardly offset relationship to the springs received in the same openings.

2. A clutch plate as set forth in claim 1, wherein said openings of said flange member are open in a radially outward direction.

3. A clutch plate as set forth in claim 2, wherein said flange member has two projections associated with each opening in said flange member, said projections circumferentially facing each other and bounding a radial orifice of said opening, said spacer member and said projections being radially substantially equidistant from said axis, whereby said projections limit circumferential movement of said spacer member relative to said flange member, said projections radially confining respective end portions of the spring received in said opening in at least one relative angular position of said disc unit relative to said hub unit.

4. A clutch plate as set forth in claim 1, wherein each spacer member and the associated spring are received in respective, radially offset portions of one of said openings in the flange member, the circumferential length of the portion receiving said spacer member being smaller than the corresponding dimension of the portion receiving said spring.

* * * * *